(12) United States Patent
Coder et al.

(10) Patent No.: US 6,725,973 B2
(45) Date of Patent: Apr. 27, 2004

(54) AUTOMATIC WIRE LUBRICATING DEVICE

(75) Inventors: Timothy L. Coder, Effingham, KS (US); Dennis D. Hartman, Smithville, MO (US)

(73) Assignee: WLD, LLC, Boston, MA (US)

( * ) Notice: Subject to any disclaimer, the term of this patent is extended or adjusted under 35 U.S.C. 154(b) by 0 days.

(21) Appl. No.: 09/991,418

(22) Filed: Nov. 15, 2001

(65) Prior Publication Data

US 2004/0000452 A1 Jan. 1, 2004

Related U.S. Application Data

(60) Provisional application No. 60/249,413, filed on Nov. 16, 2000.

(51) Int. Cl.$^7$ ................................................. F16N 7/00
(52) U.S. Cl. ................................................. 184/15.1
(58) Field of Search ........................... 184/15.1, 15.2; 403/344, 289, 290; 285/373, 419, 24, 29

(56) References Cited

U.S. PATENT DOCUMENTS

| | | | |
|---|---|---|---|
| 498,558 A | 5/1893 | Lee | |
| 1,046,170 A | * 12/1912 | Thomas | ........................ 91/340 |
| 3,565,213 A | 2/1971 | Heller | ........................... 184/15 |
| 3,783,972 A | 1/1974 | Molstad | ..................... 184/15 R |
| 4,046,225 A | 9/1977 | Shenk | ........................ 184/15 R |
| 4,063,617 A | 12/1977 | Shenk | ........................ 184/15 R |
| 4,069,894 A | 1/1978 | Black | ......................... 184/15 R |
| 4,296,837 A | 10/1981 | Charlton | ..................... 184/15 R |
| 4,326,605 A | 4/1982 | Conti | ........................... 184/15 R |
| 4,391,458 A | * 7/1983 | Blakeley | ...................... 285/373 |
| 4,422,529 A | 12/1983 | Johansen | ..................... 184/15 R |
| 4,498,558 A | * 2/1985 | Bendahan | .................... 184/15.1 |
| 4,655,432 A | 4/1987 | Woodruff | ............. 254/134.3 FT |
| 4,693,502 A | * 9/1987 | Oetiker | ........................ 184/15.1 |
| 4,749,059 A | 6/1988 | Jonnes et al. | ............... 184/15.1 |
| 4,862,996 A | * 9/1989 | Chisholm | ................... 184/15.1 |
| 5,022,493 A | 6/1991 | Buckelew | ...................... 184/16 |
| 5,632,356 A | 5/1997 | Sells | ............................ 184/15.2 |
| 6,451,744 B1 | 9/2002 | Chang | .......................... 508/106 |

* cited by examiner

*Primary Examiner*—David A. Bucci
*Assistant Examiner*—Bradley J. Van Pelt
(74) *Attorney, Agent, or Firm*—Fish & Richardson P.C.

(57) ABSTRACT

An automatic wire lubricating device includes first and second components each having a body section of semi-annular configuration defining a portion of a continuous cylindrical interior reservoir formed by the body sections when they are fastened together into an annular body defining a central opening, a pipe fitting attached on an outer circumferential side of the body section of the first component in flow communication with the interior reservoir such that the pipe fitting can be coupled to a soap line coming from a pump, dispensing holes circumferentially spaced apart defined through the body sections providing flow communication from the interior reservoir to the central opening, and coupler pins formed on opposite ends of the body sections of the first and second components which fit together so as to make a tight seal of the interior reservoir when the first and second components are fastened together.

14 Claims, 5 Drawing Sheets

AUTOMATIC WIRE LUBRICATING DEVICE

This patent application claims the benefit of U.S. provisional application No. 60/249,413, filed Nov. 16, 2000.

BACKGROUND OF THE INVENTION

1. Field of the Invention

The present invention generally relates to devices for applying a lubricant to an outer surface of insulated electrical wire or the like while pulling the same through a conduit, and, more particularly, is concerned with an automatic wire lubricating device.

2. Description of the Prior Art

In order to make it easier to pull insulated electrical wire through a conduit, it is an accepted practice to first lubricate the wire with a suitable lubricant, such as soap. A common way to accomplish this task is to do so by hand. Currently electricians place liquid soap in their hands and wipe it onto the wire.

The problem with this practice is that it can be a messy procedure and difficult job to do. When applying liquid soap by hand there is a tendency to spill the soap in a large area around where the wire is being fed into the conduit. Also, the liquid soap makes the hands slick which, in turn, makes it difficult to pull the wire off the reels and feed them into the conduit. As a result, it frequently requires one person to apply the soap to the wire and another person who does not handle the soap to pull the lubricated wire through the conduit. Thus, this accepted practice requires additional manpower to do the job correctly.

Over the years various devices have been proposed for use in lubricating wire. Representative examples of these devices are disclosed in U.S. Pat. No. 3,565,213 to Heller, U.S. Pat. No. 3,783,972 to Molstad, U.S. Pat. Nos. 4,046,225 and 4,063,617 to Shenk, U.S. Pat. No. 4,069,894 to Black, U.S. Pat. No. 4,326,605 to Conti, U.S. Pat. No. 4,422,529 to Johansen, U.S. Pat. No. 4,749,059 to Jonnes et al., U.S. Pat. No. 5,022,493 to Buckelew and U.S. Pat. No. 5,632,356 to Sells. While the prior art devices of the Molstad and Conti patents appear to constitute a step in the right direction for providing a wire lubricating device, neither seems to provide an optimum solution for the problem at hand.

Consequently, a need still exists for a wire lubricating device which provides a solution to the aforementioned problem in the prior art without introducing any new problems in place thereof.

SUMMARY OF THE INVENTION

The present invention provides an automatic wire lubricating device designed to satisfy the aforementioned need. The automatic wire lubricating device is a mechanical device which allows liquid soap to be automatically and evenly applied over the wire without the liquid soap first touching the electrician's hands. The use of such device by all electrical, data, communications and maintenance personnel who pull wire through conduits will provide for a smoother pulling of the wire and less chance of damaging the wire. The use of the mechanical device also reduces manpower requirements and thus labor costs by greatly reducing cleanup time, material costs and risk of damaging the wire.

Accordingly, the present invention is directed to an automatic lubricating wire device which comprises: (a) first and second components each having a body section of semicylindrical configuration defining a portion of a continuous cylindrical interior reservoir formed by the body sections when fastened together; (b) means for detachably fastening the body sections together to releasably secure the body sections of the first and second components together in order to assemble the body sections into an annular body having a cylindrical configuration and defining a central opening; (c) a coupler on an outer circumferential side of the body section of the first component connected in flow communication with the interior reservoir and adapted for attachment to a soap line coming from a pump; (d) means defined through the body sections extending from the interior reservoir to the central opening for providing flow communication from the interior reservoir to the central opening when the body sections are fastened together; and (e) an externally threaded cylindrical nipple formed by one of the axially displaced ends of the assembled body sections of the first and second components for attaching a bushing thereon to keep from scaring the wire or to facilitate the attachment of a rubber grommet for ensuring a "no mess" application of soap on the wire during a pull thereof through the central opening of the assembled body sections.

The present invention also is directed to an automatic wire lubricating device which comprises: (a) first and second components each having a body section of semi-cylindrical configuration defining portion of a continuous cylindrical interior reservoir formed by the body sections when fastened together; (b) means for detachably fastening the body sections together to releasably secure the body sections of the first and second components together in order to assemble the body sections into an annular body having a cylindrical configuration and defining a central opening; (c) a coupler on an outer circumferential side of the body section of the first component connected in flow communication with the interior reservoir and adapted for attachment to a soap line coming from a pump; (d) means defined through the body sections extending from the interior reservoir to the central opening for providing flow communication from the interior reservoir to the central opening when the body sections are fastened together; and (e) tubular elements formed on opposite ends of the body sections of the first and second components which fit together so as to make a tight seal of the interior reservoir when the first and second components are fastened together.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
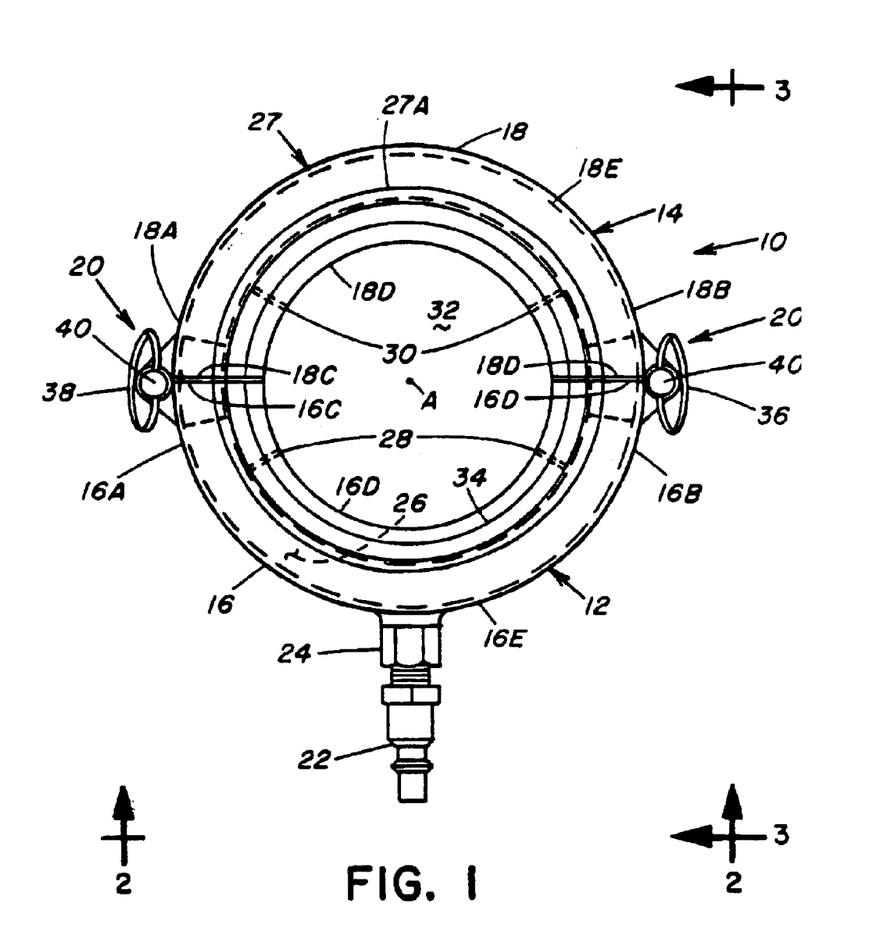
FIG. 1 is a top plan view of an automatic wire lubricating device of the present invention shown in an assembled condition.
Figure 2:
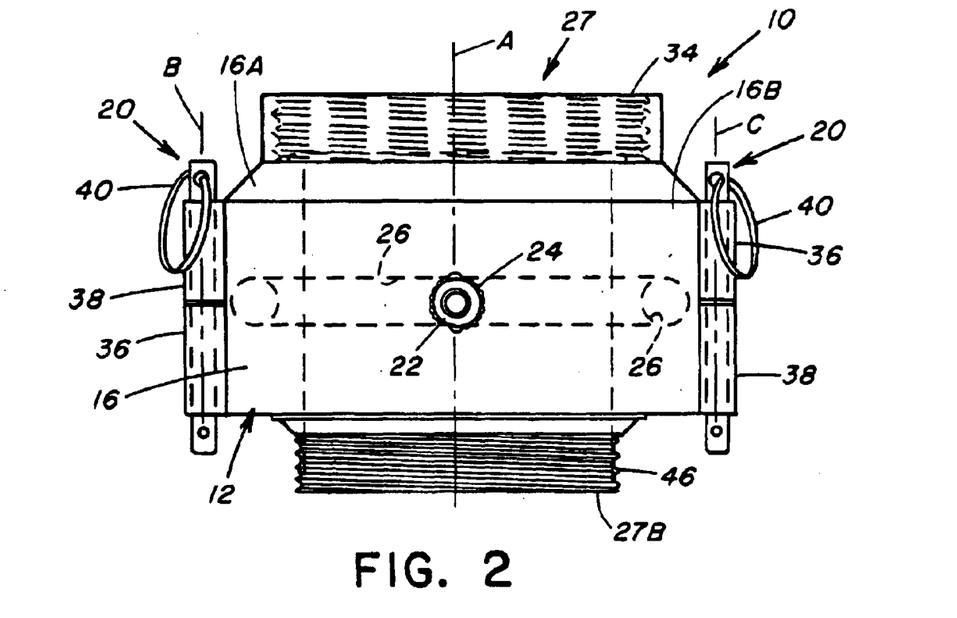
FIG. 2 is a side elevational view of the device as seen along line 2—2 of FIG. 1.
Figure 3:
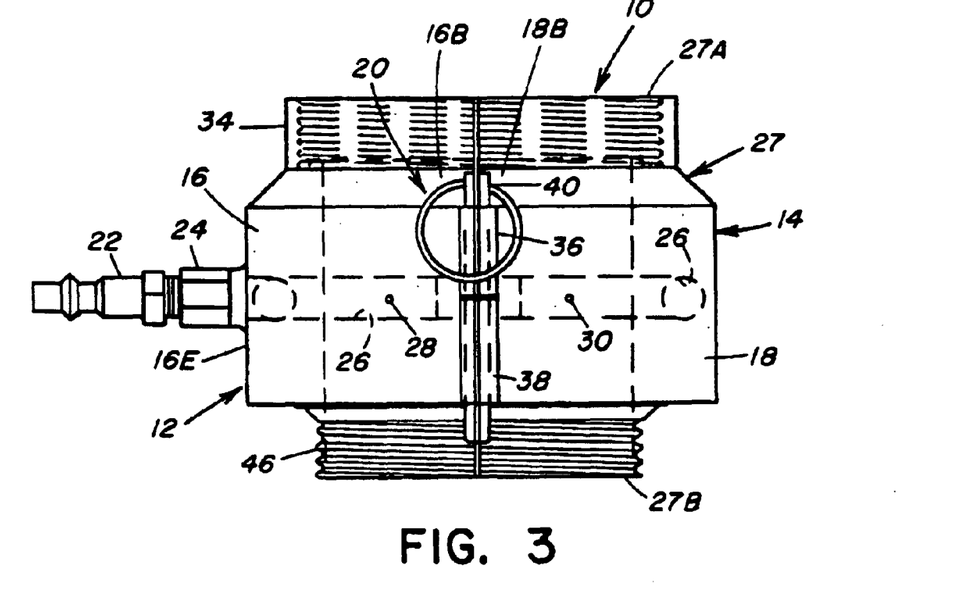
FIG. 3 is another side elevational view of the device as seen along line 3—3 of FIG. 1.

Referring to the drawings and particularly to FIGS. 1 to 3, there is illustrated an automatic wire lubricating device, generally designated 10, of the present invention in assembled form. The device 10 basically includes first and second components 12, 14, each forming a body section 16, 18 of generally arcuate and more particularly of semi-cylindrical configuration, and detachable fastening means 20 at the opposite angularly displaced ends 16A, 16B and 18A, 18B of the respective body sections 16, 18 for releasably assembling and securing the first and second components 12, 14 together at flat end faces 16C, 16D and 18C, 18D to provide the device 10 in the assembled condition of FIGS. 1 to 3. The flat end faces 16C, 16D of the body section 16 lie in a common plane and likewise the flat end faces 18C, 18D of the body section 18 lie in a common plane as clearly seen in FIGS. 4 and 7.

Figure 4:
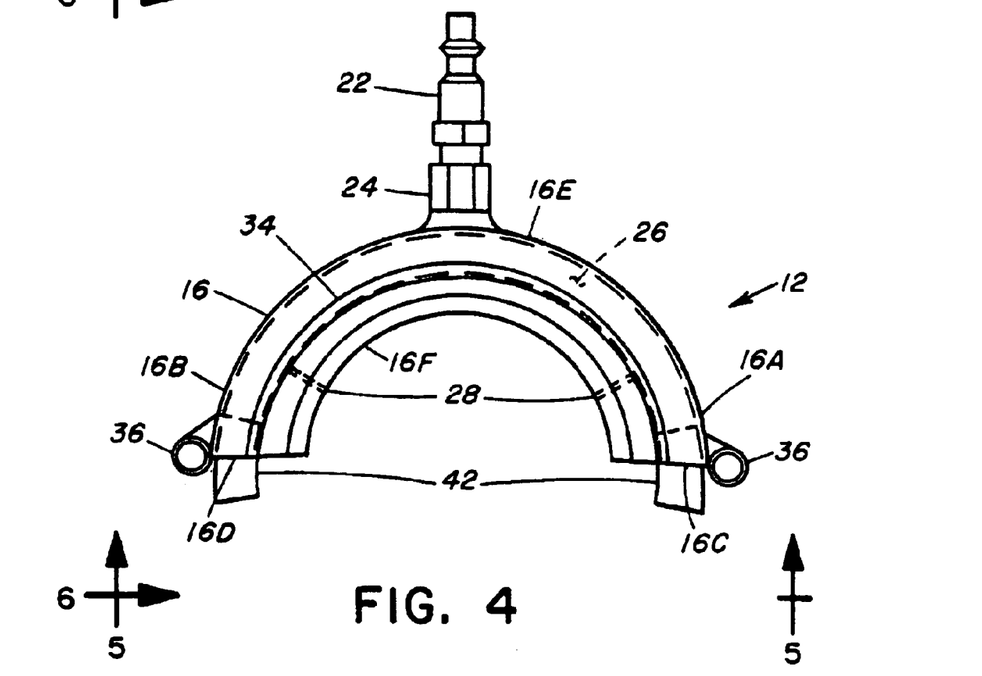
FIG. 4 is a top plan view of a first component of the device representing approximately one half of the device.
Figure 5:
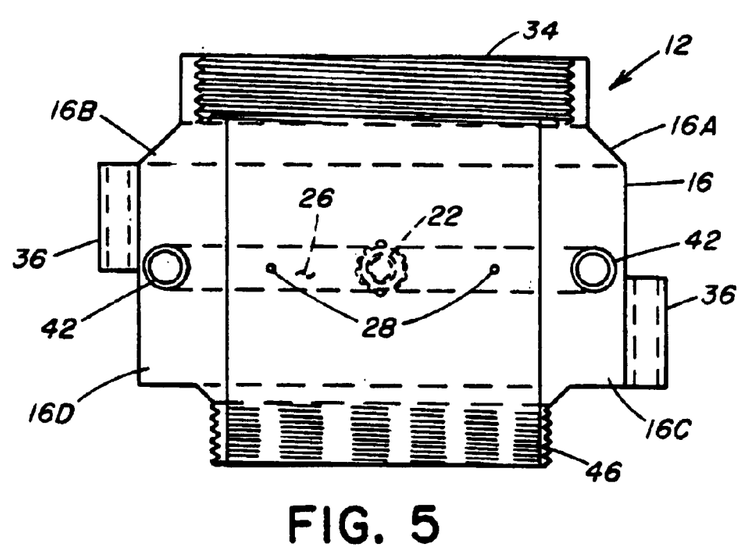
FIG. 5 is a side elevational view of the first component of the device as seen along line 5—5 of FIG. 4.
Figure 6:
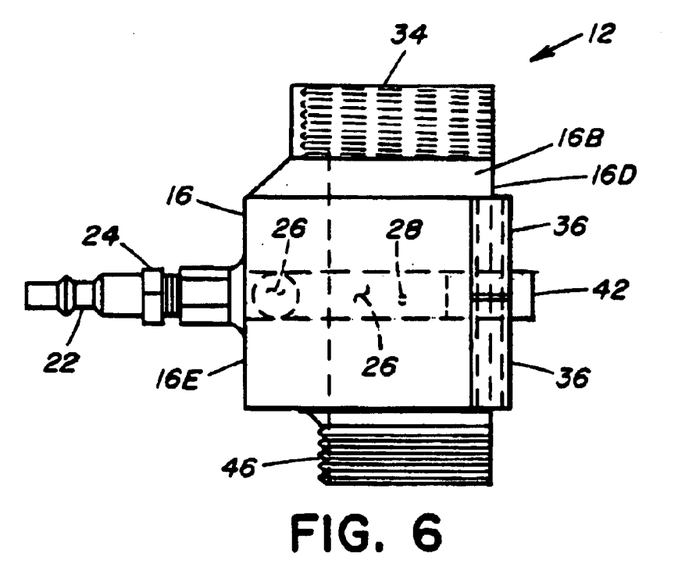
FIG. 6 is another side elevational view of the first component of the device as seen along line 5—5 of FIG. 4.
Figure 7:
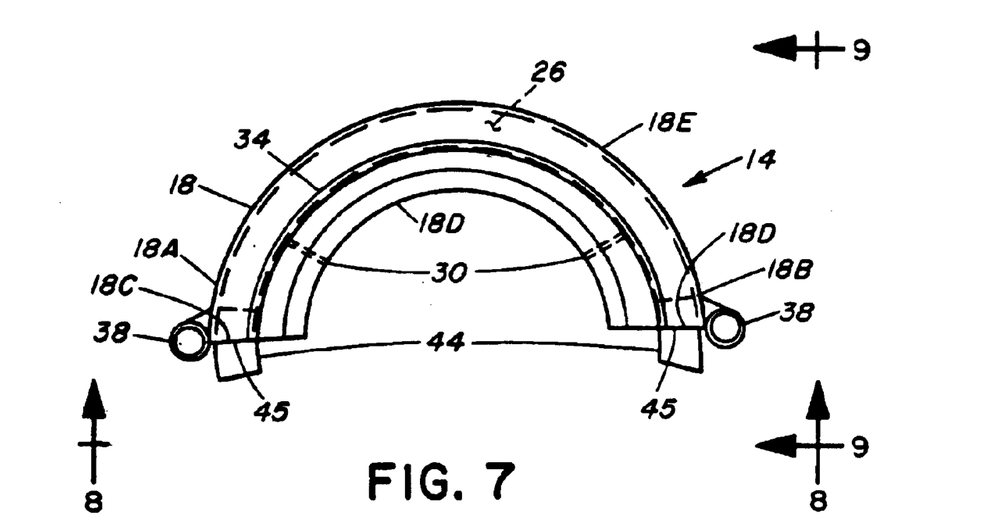
FIG. 7 is a top plan view of a second component of the device representing approximately the other half of the device.
Figure 8:
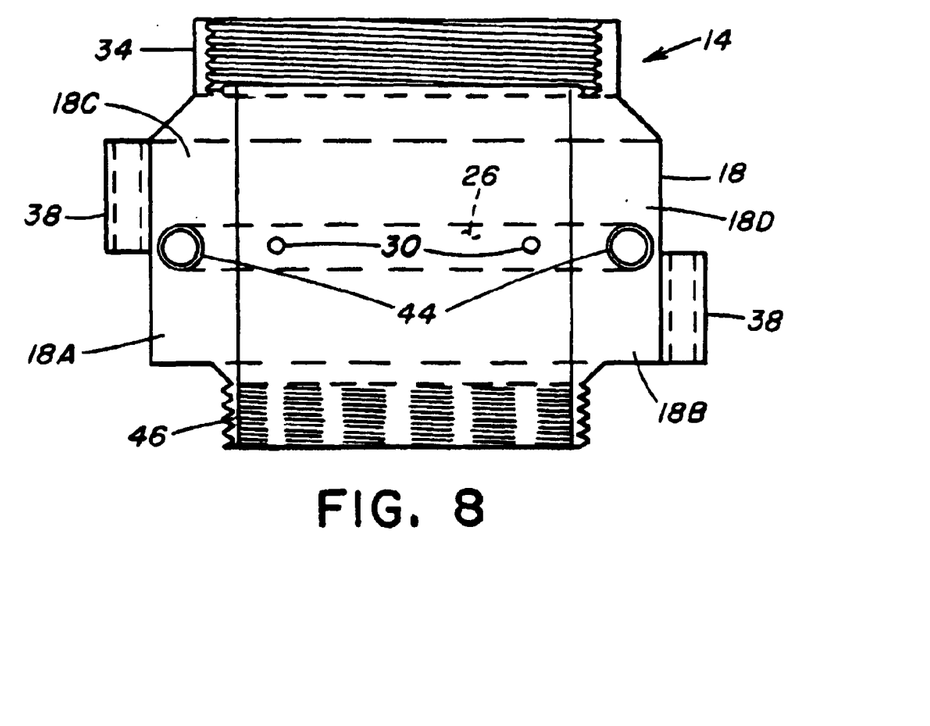
FIG. 8 is a side elevational view of the second component of the device as seen along line 8—8 of FIG. 7.
Figure 9:
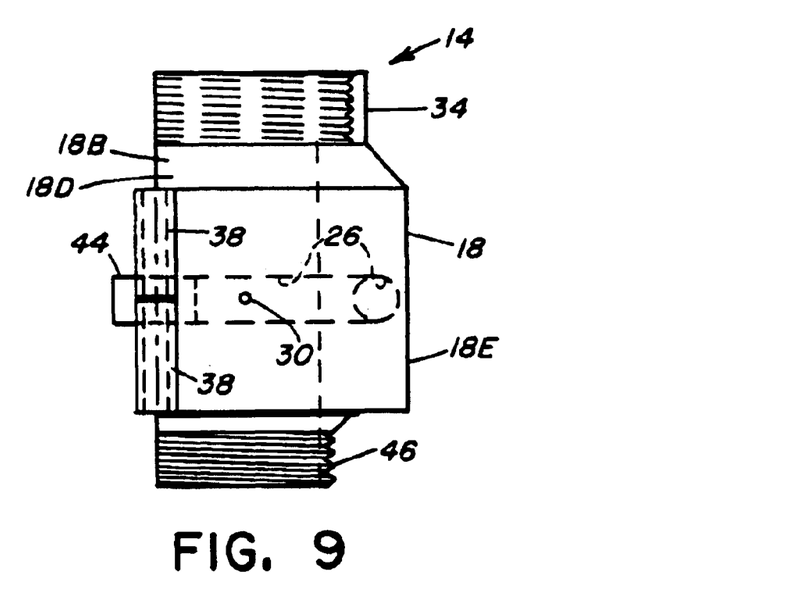
FIG. 9 is another side elevational view of the second component of the device as seen along line 9—9 of FIG. 7.

Referring also to FIGS. 4 to 9, there is illustrated the first component 12 by itself in FIGS. 4 to 6 and the second component 14 by itself in FIGS. 7 to 9. The first component 12 of the device 10 has a quick connect member 22 which fits, such as by being screwed, into a pipe fitting 24 (such as ⅜ inch in size) being attached, such as by being welded, onto an outer circumferential side 16E of the body section 16 of the first component 12. The quick connect member 22 can easily and quickly be attached to a soap line (not shown) coming from a pump (also not shown). The body sections 16, 18 of the respective first and second components 12, 14 together form an annular body 27 open at its axially displaced opposite ends 27A, 27B with each body section 16, 18 defining one half of a continuous cylindrical interior reservoir 26 in the annular body 27, as seen in FIGS. 1–3, when they first and second components 12, 14 are fastened together. The continuous interior reservoir 26 is in flow communication with the quick connect member 22 and pipe fitting 24 on the first component 12. The body sections 16, 18 also have respective dispensing or applicator holes 28, 30 defined through the interior walls portions 16F, 18F thereof which provide flow communication between the interior reservoir 26 and a central opening 32 formed through the annular body 27 of the device 10 by the first and second components 12, 14 thereof when the latter are fastened together. The annular body 27 being of cylindrical configuration has a longitudinal central axis A, as seen in FIG. 2, extending through the central opening 32 and between the opposite ends 27A, 27B of the annular body 27.

The first and second components 12, 14 additionally have formed on their body sections 16, 18 at one of the axially displaced opposite ends 27A of the annular body 27 respective halves of an internally threaded cylindrical clamping flange 34 which is concentric about the longitudinal central axis A of the annular body 27. Also, the detachable fastening means 20 are disposed adjacent to the outer circumferential sides 16E, 18E and the flat end faces 16C, 16D and 18C, 18D at the respective angularly displaced ends 16A, 16B and 18A, 18B of the body sections 16, 18. The detachable fastening means 10 includes pairs of sleeves 36, 38 and pins 40. The sleeves 36, 38 are hollow for receiving the respective pins 40. The sleeves 36 at the respective ends 16A, 16B of the body section 16 and the sleeves 38 at the respective ends 18A, 18B of the body section 18 are axially offset relative to one another, extend substantially equidistantly in opposite directions relative to the continuous interior reservoir 26 in the annular body 27, and partially Project beyond the respective flat end faces 16C, 16D or 18C, 18C, as seen in FIGS. 1 and 4–9. When the first and second components 12, 14 are assembled together at the flat end faces 16C, 18C and 16D, 18D of the body sections 16, 18, the sleeves 36, 38 at corresponding ones of the ends 16A, 18A and 16B, 18B of the body sections 16, 18 are disposed in pairs and aligned axially with one another along opposite side axes B, C, which extend substantially in a parallel relationship to the longitudinal central axis A of the annular body 27 and lie substantially in a common plane formed by said flat end faces, as seen in FIGS. 1–3. The pins 40 are slidably inserted in the same one direction along the respective parallel axes B, C through the pairs of aligned hollow sleeves 36, 38 so as to hold the two body sections 16, 18 of the first and second components 12, 14 together. For taking the first and second components 12, 14 apart, the pins 40 can be slidably withdrawn from the pairs of aligned sleeves 36, 38 in the same reverse direction along the respective parallel side axes B, C of the aligned sleeves 36, 38.

Further, coupler pins 42, 44 of hollow construction and slightly arcuate shape are attached at the flat end faces 16C, 16D and 18C, 18D of the angularly displaced opposite ends 16A 16B and 18A, 18B of the body sections 16, 18 of the first and second components 12, 14 so as project outwardly from the flat end faces 16C, 16D and 18C, 18D and provide commumuication between the opposite ends of the halves of the interior reservior 26 defined by the body sections 16, 18. The hollow coupler pins 42, 44 have O-rings 45 disposed around them and the coupler pins 42, 44 fit together so as to make a tight seal between the halves of the interior reservoir 26 where the flat end faces 16C, 16D and 18C, 18D of the body sections 16, 18 are placed flush together when the first and second components 12, 14 are fastened together.

The first and second components 12, 14 additionally have formed on their body sections 16, 18 at the other of the axially displaced opposite ends 27B of the annular body 27 respective halves of an externally threaded cylindrical nipple 46 which is concentric about the longitudinal central axis A of the annular body 27. The nipple 46 allows the attachment of a member such as a bushing thereon to keep from scaring the wire or a rubber grommet for ensuring a "no mess" application of soap on the wire during a vertical pull thereof.

The actual physical size of the device 10 depends on the trade size of the conduit one is pulling wire through, resulting in a different size device for each trade size of conduit. Also, it should be understood that the device 10 can be manufactured by various suitable conventional methods using various suitable conventional materials and having various different configurations.

In summary, the automatic wire lubricating device 10 is a double pin clamping device that clamps over all trade size conduits and has a small male adapter or quick connect 22 that connects to either a manual or electrical pump for supplying liquid soap into the device 10 and has a plurality of interior holes 28, 30, such as four in number, from which liquid soap is dispensed evenly and completely over the wire so as to lubricate the wire as it is pulled through the central opening 32 of the device 10: The advantages of the device 10 are: (1) mess free application; (2) less cleanup; (3) less manpower required; (4) less expense; and (5) more consistent job of lubricating the wire being pulled.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An automatic wire lubricating device, comprising:
   (a) first and second components each including a body section of semi-cylindrical configuration having a pair of opposite ends and respective flat end faces on said opposite ends, each of said body sections defining a portion of a continuous cylindrical interior reservoir formed by said body sections when assembled together at said flat end faces thereof;
   (b) means for detachably fastening said body sections of said first and second components together when said body sections are assembled together at said flat end faces to releasably secure said body sections into an annular body having a cylindrical configuration and defining a central opening, said annular body also having a longitudinal central axis extending through said central opening and between axially displaced opposite ends of said annular body, said means for detachably fastening said body sections together including
      (i) hollow sleeves attached at said opposite ends of each of said body sections and partially projecting beyond said flat end faces of said body sections such that said sleeves are aligned axially with one another in pairs along opposite side axes which extend substantially parallel to said longitudinal central axis of said annular body and lie substantially in a common plane formed by said flat end faces when said body sections of said first and second components are assembled together into said annular body, and
      (ii) a pair of pins each inserted through one of said pairs of aligned hollow sleeves along said one of said opposite side axes for releasably securing said assembled body sections of said first and second components together into said annular body;
   (c) a coupler on an outer circumferential side of said body section of said first component connected in flow communication with said interior reservoir and adapted for attachment to a soap line coming from a pump;
   (d) means defined through said body sections extending from said interior reservoir to said central opening for providing flow communication from said interior reservoir to said central opening when said body sections are fastened together; and
   (e) a threaded cylindrical nipple, concentric about said longitudinal axis of said annular body, formed by one of said axially displaced ends of said annular body formed by said assembled body sections of said first and second components for attaching a member thereon to facilitate application of soap on wire during a vertical pull thereof through said cylindrical nipple and said central opening of said annular body.

2. The device of claim 1 further comprising:
   an internally threaded cylindrical clamping flange, concentric about said longitudinal central axis of said annular body, formed by the other of the axially displaced ends of said annular body formed by said assembled body sections of said first and second components for attaching about a threaded end of an externally threaded conduit through which the wire is to be pulled.

3. The device of claim 1 further comprising:
   hollow coupler pins attached on said flat end faces at said opposite ends of at least one of said body sections of said first and second components so as to provide communication between opposite ends of halves of said interior reservoir formed by said body sections when said body sections are assembled together at said flat end faces and thereby make a tight seal of said halves of said interior reservoir when said first and second components are fastened together.

4. The device of claim 1 wherein said interior reservoir, flow communication providing means and hollow coupler pins are arranged to permit soap to travel 360 degrees through the interior reservoir around said annular body formed by said body sections of said first and second components.

5. The device of claim 4 wherein said flow communication providing means is a plurality of interior dispensing holes circumferentially spaced apart permitting the squirting out through said interior dispensing holes onto the wire being pulled through said central opening of said annular body.

6. The device of claim 1 wherein said pins are inserted in the same one direction along said respective parallel side axes through said pairs of aligned sleeves for releasably securing said assembled body sections of said first and second components together.

7. The device of claim 1 wherein said coupler includes:
   a pipe fitting attached on an outer circumferential side of said body section of said first component and in flow communication with said interior reservoir; and
   a quick connect member which fits into said pipe fitting such that said quick connect member can be attached to a soap line coming from a pump.

8. An automatic wire lubricating device, comprising:
   (a) first and second components each including a body section of semi-cylindrical configuration having a pair of opposite ends and respective flat end faces on said opposite ends, each of said body sections defining a portion of a continuous cylindrical interior reservoir formed by said body sections when assembled together at said flat end faces thereof;

(b) means for detachably fastening said body sections of said first and second components together when said body sections are assembled together at said flat end faces to releasably secure said body sections into an annular body having a cylindrical configuration and defining a central opening through which wire is to be pulled, said annular body also having a longitudinal central axis extending through said central opening and between axially displaced opposite ends of said annular body, said means for detachably fastening said body sections together including (i) hollow sleeves attached at said opposite ends of each of said body sections in offset relation to one another and extending substantially equidistantly in opposite directions in relation to said continuous cylindrical interior reservoir in said annular body and partially projecting beyond said flat end faces of said body sections such that said sleeves at a respective one of said opposite ends of said body sections are aligned axially with one another in pairs along opposite side axes which extend substantially parallel to said longitudinal central axis of said annular body and lie substantially in a common plane formed by said flat end faces when said body sections of said first and second components are assembled together into said annular body, and (ii) a pair of pins each inserted through and withdrawable from one of said pairs of axially aligned hollow sleeves along one of said opposite side axes for releasably securing said assembled body sections together into said annular body and for taking apart from one another said assembled body sections of said annular body;

(c) a coupler on an outer circumferential side of said body section of said first component connected in flow communication with said interior reservoir and adapted for attachment to a soap line coming from a pump;

(d) means defined through said body sections extending from said interior reservoir to said central opening for providing flow communication from said interior reservoir to said central opening when said body sections are fastened together; and (e) means formed on said flat end faces of said body sections of said first and second components and at opposite ends of halves of said interior reservoir formed by said body sections for fitting together so as to make a tight seal of and provide communication between said halves of said interior reservoir when said first and second components are fastened together.

9. The device of claim 8 further comprising:

an internally threaded cylindrical clamping flange, concentric about said longitudinal central axis of said annular body, formed by the other of the axially displaced ends of said annular body formed by said assembled body sections of said first and second components for attaching about a threaded end of an externally threaded conduit through which the wire is to be pulled.

10. The device of claim 8 wherein said interior reservoir, said flow communication providing means and said fitting means are arranged to permit soap to travel 360 degrees through said interior reservoir around said annular body formed by said body sections of said first and second components.

11. The device of claim 8 wherein said flow communication providing means is a plurality of interior dispensing holes circumferentially spaced apart permitting the squirting out through said interior dispensing holes onto the wire being pulled through said central opening of said annular body.

12. The device of claim 8 wherein said pins are inserted in the same one direction along said respective parallel side axes through said pairs of aligned hollow sleeves for releasably securing said assembled body sections of said first and second components together and correspondingly said pins are withdrawable in a same other direction the reverse of said same one direction along said respective parallel side axes from said pairs of aligned hollow sleeves for taking said assembled body sections apart from one another.

13. The device of claim 8 wherein said coupler includes:

a pipe fitting attached on an outer circumferential side of said body section of said first component and in flow communication with said interior reservoir; and a quick connect member which fits into said pipe fitting such that said quick connect member can be attached to a soap line coming from a pump.

14. An automatic wire lubricating device, comprising:

(a) first and second components each including a body section of semi-cylindrical configuration having a pair of opposite ends and respective flat end faces on said opposite ends, each of said body sections defining one-half of a continuous cylindrical interior reservoir formed by said body sections when they are assembled together at said flat end faces thereof;

(b) means for detachably fastening said body sections of said first and second components together when said body sections are assembled together at said flat end faces to releasably secure said body sections into an annular body having a cylindrical configuration and defining a central opening, said annular body also having a longitudinal central axis extending through said central opening and between axially displaced opposite ends of said annular body, said means for detachably fastening said body sections together including (i) hollow sleeves attached at said opposite ends of each of said body sections in offset relation to one another and extending substantially equidistantly in opposite directions relative to said continuous cylindrical interior reservoir in said annular body and partially protecting beyond said flat end faces of said body sections such that said sleeves at a respective one of said opposite ends of said body sections are aligned axially with one another in pairs along opposite side axes which extend substantially parallel to said longitudinal central axis of said annular body and lie substantially in a common plane formed by said flat end faces when said body sections of said first and second components are assembled together into said annular body, and (ii) a pair of pins each inserted through and withdrawable from one of said pairs of axially aligned hollow sleeves along one of said opposite side axes for releasably securing said assembled body sections together into said annular body and for taking apart from one another said assembled body sections of said annular body, said pins being inserted in the same one direction along said respective parallel side axes through said pairs of aligned hollow sleeves for releasably securing said assembled body sections of said first and second components together into said annular body and correspondingly said pins being withdrawable in a same other direction being the reverse of said same one direction along said respective parallel side axes from said pairs of aligned hollow sleeves for taking said body sections apart from one another;

(c) a pipe fitting attached on an outer circumferential side of said body section of said first component in flow communication with said interior reservoir such that said pipe fitting can be coupled to a soap line coming from a pump;

(d) circumferentially spaced dispensing holes defined through interior walls portions of said body sections which provide flow communication between said interior reservoir and said central opening formed through said annular body defined by said body sections of said first and second components when the latter are fastened together;

(e) an externally threaded cylindrical nipple formed by one of said axially displaced ends of said annular body formed by said assembled body sections of said first and second components for attaching a member thereon to facilitate application of soap on wire during a vertical pull thereof through said cylindrical nipple and said central opening of said annular body;

(f) an internally threaded cylindrical clamping flange formed by the other of the axially displaced ends of said annular body formed by assembled body sections of said first and second components for attaching about a threaded end of an externally threaded conduit through which the wire is to be pulled; and (g) hollow coupler pins attached on said flat end faces of at least one of said body sections of the first and second components and having O-rings disposed around said hollow coupler pins so as to make a tight seal of said interior reservoir at said flat end faces of said body sections when said first and second components are fastened together.

* * * * *

UNITED STATES PATENT AND TRADEMARK OFFICE
CERTIFICATE OF CORRECTION

PATENT NO.     : 6,725,973 B2
DATED          : April 27, 2004
INVENTOR(S)    : Timothy L. Coder and Dennis D. Hartman It is certified that error appears in the above-identified patent and that said Letters Patent is hereby corrected as shown below:

Column 3,
Line 56, after "when" replace "they" with -- the --.

Column 4,
Line 23, after "partially", replace "Project" with -- project --.
Line 48, after "16A", insert -- , --.
Line 60, insert the following paragraph:
-- The device 10 is connected to and held in place on a threaded end of a conduit (not shown) by attaching the two halves of the internally threaded cyclindrical clamping flange 34 about the thread end of the conduit as explained above by inserting the pins 40 into the aligned sleeves 36, 38. When a pump feeds liquid soap through the quick connect member 22 into the interior reservoir 26, the liquid soap travels 360 degrees through the interior reservoir 26 around the device 10 and squirts out through the interior dispensing or applicator holes 28, 30 onto the wire being pulled through the central opening 32 of the device 10 into the threaded end of the conduit. --

Signed and Sealed this

Twenty-fourth Day of August, 2004

JON W. DUDAS
*Director of the United States Patent and Trademark Office*